(12) United States Patent
Riou (10) Patent No.: US 9,929,858 B2
(45) Date of Patent: Mar. 27, 2018

(54) METHOD AND SYSTEM FOR DETECTING FAULT ATTACKS

(71) Applicant: NXP B.V., Eindhoven (NL)

(72) Inventor: Sebastien Riou, Seongnam si (KR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/860,619

(22) Filed: Sep. 21, 2015

(65) Prior Publication Data

US 2017/0085369 A1   Mar. 23, 2017

(51) Int. Cl.
*H04L 9/00* (2006.01)
*H04L 9/32* (2006.01)
*G06F 11/10* (2006.01)
*G09C 1/00* (2006.01)

(52) U.S. Cl.
CPC .......... *H04L 9/004* (2013.01); *G06F 11/1004* (2013.01); *G09C 1/00* (2013.01); *H04L 9/3239* (2013.01); *H04L 2209/24* (2013.01)

(58) Field of Classification Search
None
See application file for complete search history.

(56) References Cited

U.S. PATENT DOCUMENTS

| | | | | |
|---|---|---|---|---|
| 5,832,207 | A * | 11/1998 | Little | G06F 7/588 726/36 |
| 8,397,042 | B2 | 3/2013 | Riou | |
| 8,397,152 | B2 | 3/2013 | Lisart et al. | |
| 8,720,600 | B2 | 5/2014 | Teglia | |
| 8,751,822 | B2 * | 6/2014 | Anderson | H04L 9/002 380/270 |
| 8,954,806 | B2 * | 2/2015 | Dan | G11C 29/10 714/41 |
| 9,311,477 | B2 * | 4/2016 | Marinet | G06F 21/554 |
| 2007/0014395 | A1 | 1/2007 | Joshi et al. | |
| 2008/0152144 | A1 * | 6/2008 | Douguet | H04L 9/004 380/277 |
| 2009/0113546 | A1 | 4/2009 | Kim et al. | |
| 2011/0255689 | A1 * | 10/2011 | Bolotov | H04L 9/0631 380/42 |
| 2012/0144244 | A1 * | 6/2012 | Dan | G11C 29/10 714/39 |

(Continued)

OTHER PUBLICATIONS

Bar-El, H. et al.; "The Sorcerer's Apprentice Guide to Fault Attacks", Proceedings of the IEEE, vol. 94, No. 2, pp. 370-382, Feb. 1, 2006.

(Continued)

*Primary Examiner* — Saleh Najjar
*Assistant Examiner* — Louis Teng (57) ABSTRACT

In an embodiment, an integrated circuit (IC) device for detecting fault attacks is disclosed. In the embodiment, the IC device includes a main CPU core, memory coupled to the main CPU core, and a co-processor core including a checksum generation module, the co-processor core coupled to the main CPU core, wherein the main CPU core is configured to direct the co-processor core to process data from the memory and the co-processor core is configured to process the data, in part, by feeding internal signals to the checksum generation module and wherein the co-processor core is further configured to return a checksum value generated by the checksum generation module to the main CPU core.

11 Claims, 7 Drawing Sheets

(56) References Cited

U.S. PATENT DOCUMENTS

| | | | | |
|---|---|---|---|---|
| 2012/0159194 A1* | 6/2012 | Anderson | ............... | H04L 9/002 713/190 |
| 2013/0159791 A1* | 6/2013 | Marinet | ................ | G06F 21/554 714/48 |
| 2014/0020095 A1 | 1/2014 | Riou | | |
| 2014/0077835 A1 | 3/2014 | Amanuma et al. | | |
| 2014/0188971 A1* | 7/2014 | Aahlad | ................... | H04L 67/10 709/201 |

OTHER PUBLICATIONS

Selmane, Nidhal; "Global and Local Fault attacks on AES cryptoprocessor: Implementation and Countermeasures", http://tel.archives-ouvertes.fr/pastel-00565881/document, retrieved on Jan. 31, 2017.

European Search Report, 16186779.1, dated Feb. 1, 2017.

* cited by examiner

METHOD AND SYSTEM FOR DETECTING FAULT ATTACKS

BACKGROUND

When computationally intensive code is processed, hardware accelerators can be used to accelerate the computation of the code beyond speeds that are typically provided by a general purpose processor. To accelerate computation of the code, hardware accelerators are typically implemented with specialized processors separate from the main computer processing units (CPU). The specialized processors can be optimized to perform specific computations more efficiently (e.g., multiple calculations in parallel) than is typically possible on a main CPU and to then pass the computed result back to the main CPU for further computation. However, because computed results are passed between the hardware accelerator and the main CPU, even if both the main CPU and the hardware accelerator are secure, the system (e.g., the main CPU and the hardware accelerator) can still be subject to fault attacks (e.g., attacks that modify the behavior of an integrated circuit by causing bits to change or flip).

SUMMARY

In an embodiment, an integrated circuit (IC) device for detecting fault attacks is disclosed. In the embodiment, the IC device includes a main CPU core, memory coupled to the main CPU core, and a co-processor core including a checksum generation module, the co-processor core coupled to the main CPU core, wherein the main CPU core is configured to direct the co-processor core to process data from the memory and the co-processor core is configured to process the data, in part, by feeding internal signals to the checksum generation module and wherein the co-processor core is further configured to return a checksum value generated by the checksum generation module to the main CPU core.

In another embodiment, the main CPU core is configured to terminate execution of the program if an invalid checksum value is returned.

In another embodiment, the co-processor core is further configured to return a valid checksum value when the data is processed by the co-processor core.

In another embodiment, the co-processor core has special function registers (SFRs) in which system states of the checksum generation module are stored.

In another embodiment, the SFRs are configured to reset to a default value after a read operation occurs.

In another embodiment, the data is used to perform advanced encryption standard (AES) functions and the co-processor core is configured to perform the AES functions by feeding a control path and a key schedule path to the checksum generation module.

In another embodiment, the control path and the key schedule path are fed to the checksum generation module separately and the co-processor core is configured to store the results in separate SFRs.

In another embodiment, additional fault detection modules are coupled to the checksum generation module and error signals from the additional fault detection modules can corrupt the checksum value generated by the checksum generation module.

In a second embodiment, a method for detecting fault attacks is disclosed. In the embodiment, the method involves sending data to a co-processor core for processing, receiving a result and a checksum value back from the co-processor core, and detecting a fault attack if the returned checksum value is invalid.

In another embodiment, the method further involves halting execution of the program if an invalid checksum is returned.

In another embodiment, a checksum is invalid when the data is not processed by the co-processor core.

In another embodiment, the data sent to the co-processor core is for use in an AES function, the data including a control path and a key schedule path.

In another embodiment, processing data by the co-processor core involves feeding the data to a checksum generation module to generate a checksum value, storing the generated checksum value in a SFR, providing the checksum value stored in the SFR back to a main CPU core for further processing, and resetting the SFR to a default value.

In another embodiment, a control path is fed to the checksum generation module separate from a key schedule path and the value generated by the checksum generation module for the control path is stored in a first SFR and the value generated by the checksum generation module for the key schedule path is stored in a second SFR.

In another embodiment, the checksum value includes information about accesses of the SFR.

In another embodiment, a checksum value is invalid if the address produced by XORing a target address with the checksum value does not correspond to a valid memory location.

In another embodiment, a checksum value is invalid if the address produced by XORing a return address with a value generated by processing the data sent to the co-processor core does not correspond to a valid memory location.

In a third embodiment, a computer-implemented system for detecting fault attacks is disclosed. In the embodiment, the system includes a main CPU core, a co-processor core, and a non-transitory computer-readable storage medium, the medium storing instructions that, when executed by the main CPU core, cause the main CPU core to send data of a program stored in the storage medium for use in performing an AES function to the co-processor core for processing, receive a result and a checksum value back from the co-processor core, and detect a fault attack if the returned checksum value is invalid, wherein a checksum value is invalid when the AES function is not performed by the co-processor core, and terminate execution of the program if a fault attack is detected.

In another embodiment, the co-processor core is configured to feed the data for use in performing an AES function to a checksum generation module to generate a checksum value, store the generated checksum value in a SFR, provide the checksum value stored in the SFR back to a main CPU core for further processing, and reset the SFR to a default value.

In another embodiment, the data fed to the checksum generation module includes a control path and a key schedule path and the value generated by the checksum generation module for the control path is stored in a first SFR and the value generated by the checksum generation module for the key schedule path is stored in a second SFR.

Other aspects and advantages of embodiments of the present invention will become apparent from the following detailed description taken in conjunction with the accompanying drawings.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
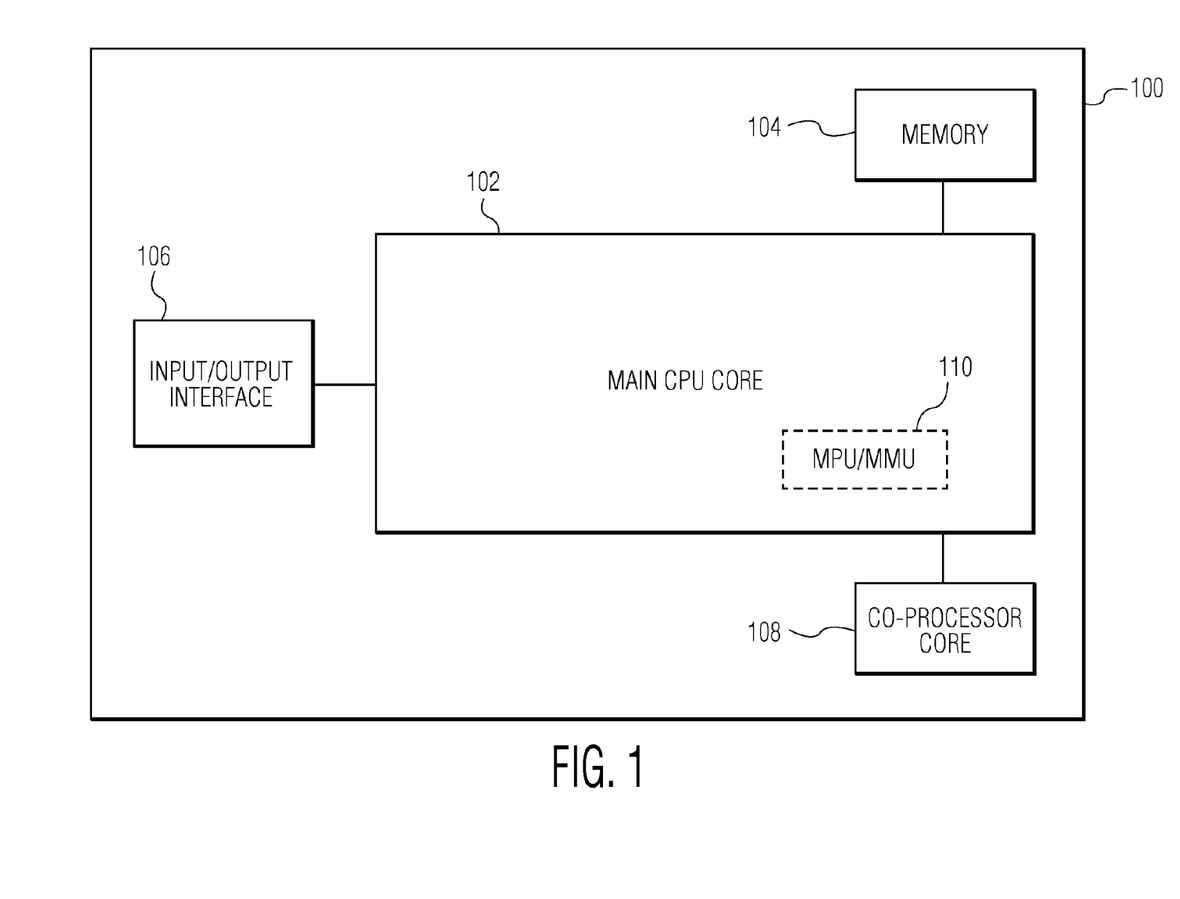
FIG. 1 is a block diagram of an integrated circuit (IC) device with a hardware accelerator.

FIG. 1 is a block diagram of an integrated circuit (IC) device 100 with a hardware accelerator. The IC device includes a main computer processing unit (CPU) core 102, memory 104, an input/output (I/O) interface 106, and a co-processor core 108. An individual processing unit within a processor is referred to as a core. In an embodiment, the main CPU core and the cop-processor core are located on the same chip, but could be placed on separate chips in other embodiments. In the example of FIG. 1, the main CPU core is a secure CPU core that includes a memory protection unit (MPU) and/or a memory management unit (MMU) 110. In operation, the main CPU core processes instructions from the I/O interface or from memory and passes data to the co-processor core to process. For example, data on which to perform encryption or decryption using the advanced encryption standard (AES) can be passed to the co-processor core.

Figure 2:
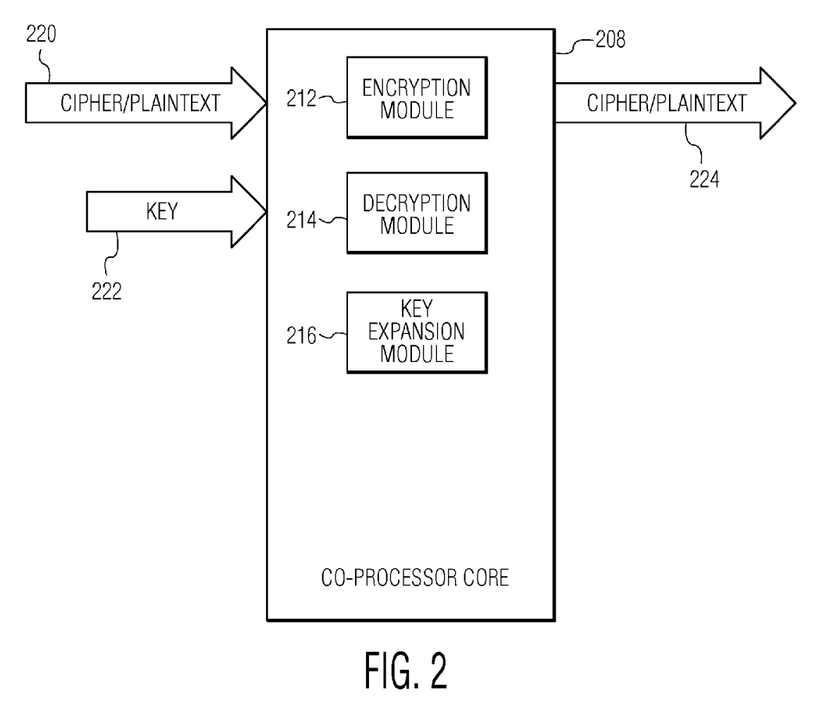
FIG. 2 is a block diagram of a co-processor core in operation.

FIG. 2 is a block diagram of a co-processor core 208 in operation. In the example of FIG. 2, the co-processor core is equipped to perform AES encryption and/or decryption and includes an encryption module 212, a decryption module 214, and a key expansion module 216. In operation, when the main CPU core passes data on which AES encryption/decryption is to be performed to the co-processor core, the main CPU core passes a cipher (if decryption is to be performed) or plain text 220 (if encryption is to be performed) along with a key 222 to the co-processor core. The encryption module or decryption module are configured to encrypt plain text or decrypt a cipher, accordingly. The key expansion module is configured to perform a key schedule (e.g., a cryptographic algorithm that, given the key, calculates subkeys for each round of the key schedule) in the encryption or decryption process. The co-processor core then passes an encrypted cipher or plain text 224 back to the main CPU core for further processing.

Figure 3:
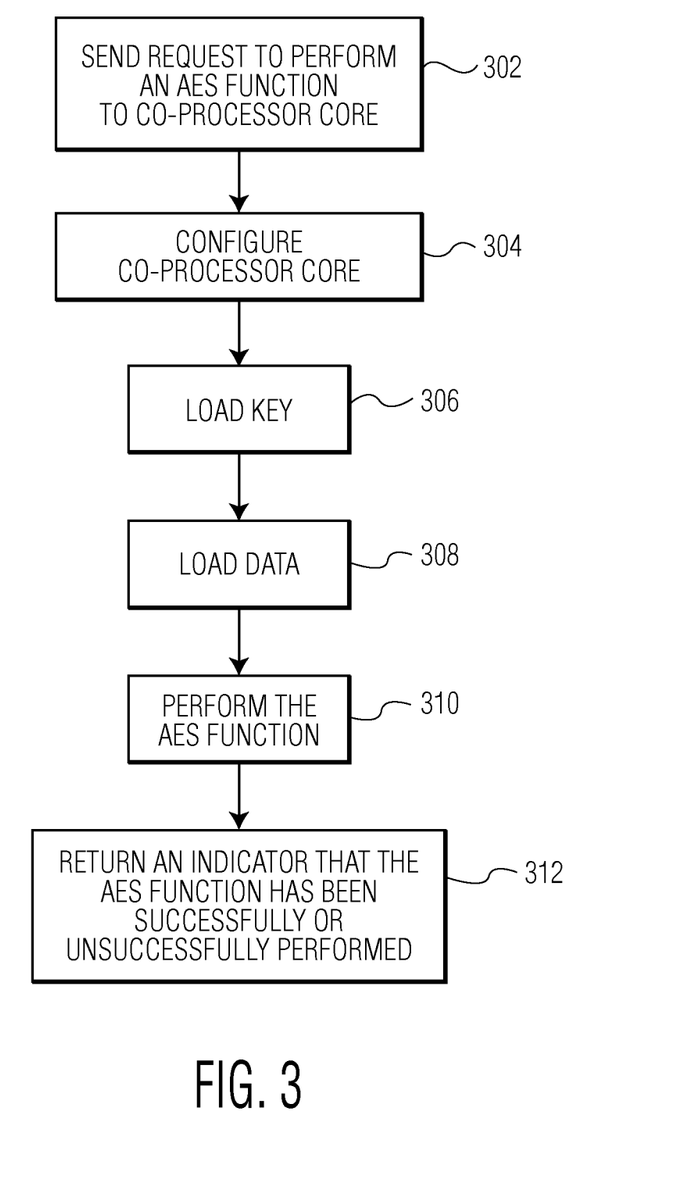
FIG. 3 is a flow chart diagram of a method for computing an AES function using a co-processor core.

FIG. 3 is a flow chart diagram of a method for computing an AES function using a co-processor core, such as the co-processor core described with respect to FIG. 2. At block 302, a request is sent to the co-processor core to perform an AES function. In an example, the request includes a key and a cipher or plain text sent by the main CPU core to the co-processor core. At block 304, the co-processor core is configured to perform the AES function. In an example, configuring a co-processor core involves loading values into registers in order to place the co-processor core into an initial state. In normal operation, at block 306, a key (e.g., the key provided with the request at block 302) is loaded into one (or more) register of the co-processor core, at block 308, data (e.g., the cipher or plain text provided with the request at block 302) is loaded in one (or more) register, and, at block 310, the co-processor core performs the AES function. However, the main CPU core is unable to determine if these functions have been properly performed. Instead, at block 312, an indicator that the AES function has successfully or unsuccessfully been performed is all that is returned to the main CPU core. Because only an indicator is returned to the main CPU core, the main CPU core cannot be certain that the co-processor core has, in fact, performed the AES function or that an attacker has not caused a fault in the co-processor core. Thus, even in a system with a secure main CPU core and a secure co-processor core, security could still be compromised if, for example, an attack causes a successful indicator to return to the main CPU without performing the AES function.

In an embodiment, an integrated circuit (IC) device for detecting fault attacks is disclosed. In the embodiment, the IC device includes a main CPU core, memory coupled to the main CPU core, and a co-processor core including a checksum generation module, the co-processor core coupled to the main CPU core, wherein the main CPU core is configured to direct the co-processor core to process data from the memory and the co-processor core is configured to process the data, in part, by feeding internal signals to the checksum generation module and wherein the co-processor core is further configured to return a checksum value generated by the checksum generation module to the main CPU core. In an embodiment, the checksum value will only be valid if the data is actually processed (e.g., operations are actually performed), and, thus, if the checksum value returned to the main CPU core is invalid, the main CPU core can terminate execution of the program accordingly.

Figure 4:
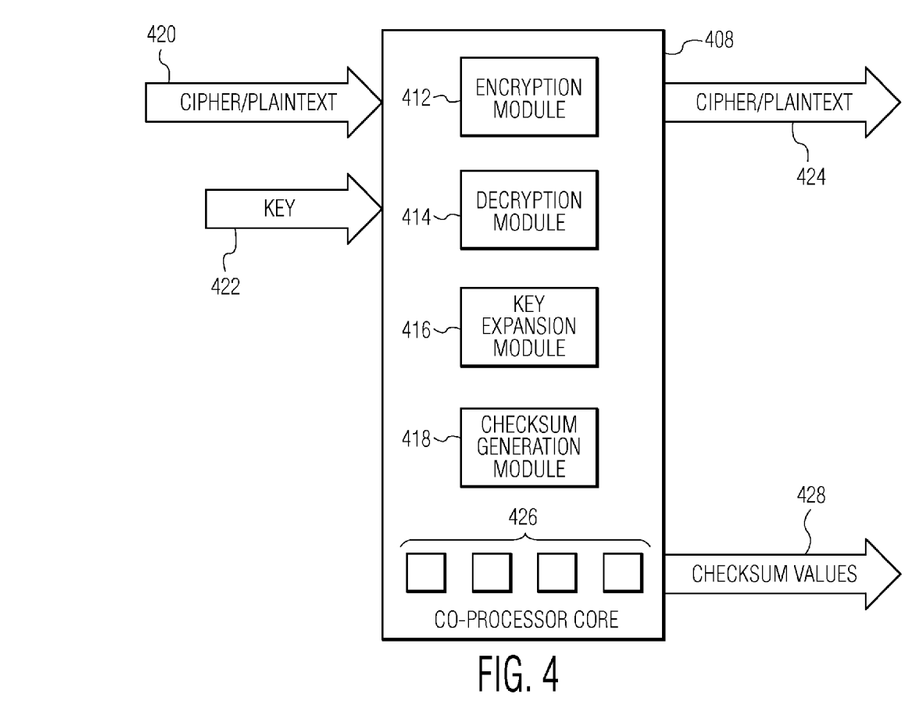
FIG. 4 is a block diagram of a co-processor core in operation in accordance with an embodiment of the invention.
Figure 5:
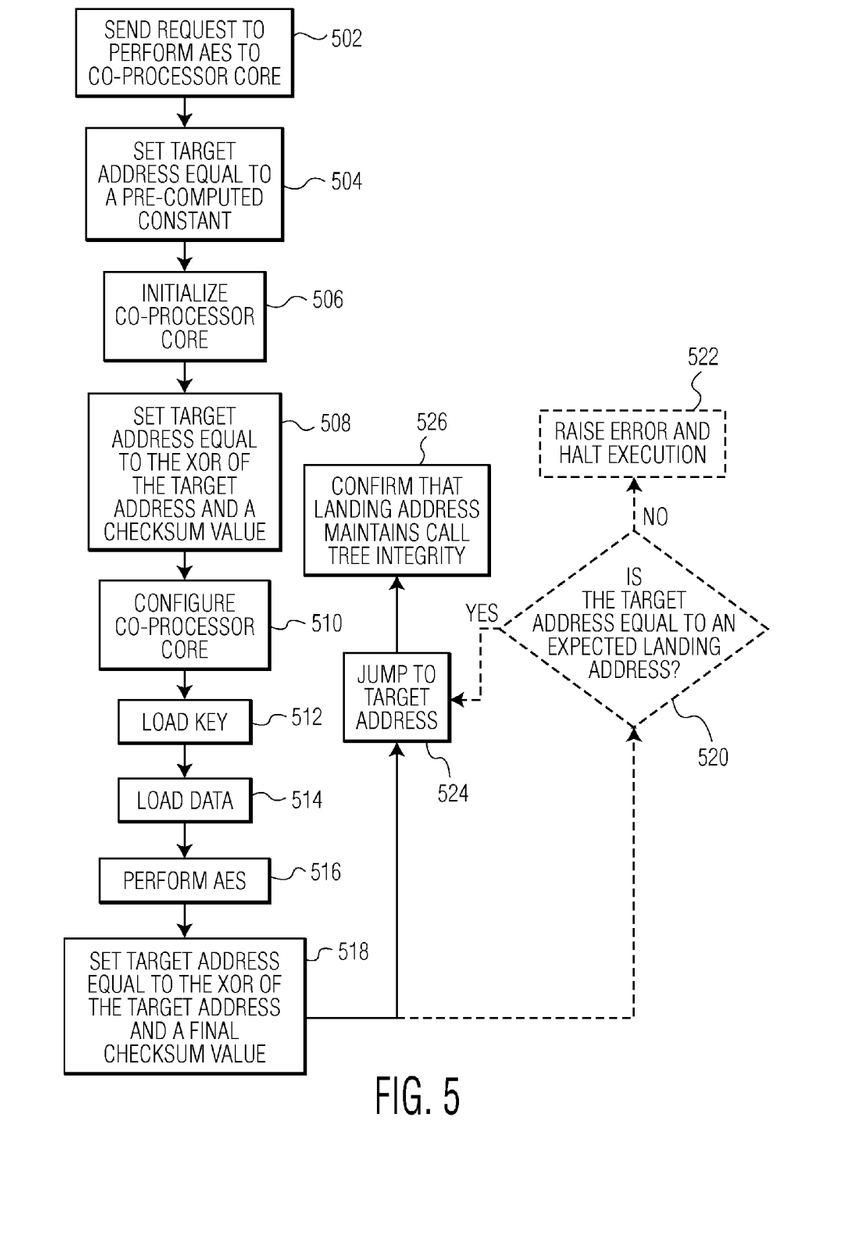
FIG. 5 is a flow chart diagram of a method for performing an AES function using a co-processor core in accordance with an embodiment of the invention.

FIG. 4 is a block diagram of a co-processor core 408 in operation in accordance with an embodiment of the invention. In the embodiment of FIG. 4, the co-processor core is equipped to perform AES encryption and/or decryption and includes an encryption module 412, a decryption module 414, a key expansion module 416, and a checksum generation module 418. In operation, when the main CPU core passes data to the co-processor core on which AES encryption/decryption is to be performed, the data passed to the co-processor core includes a cipher (if decryption is to be performed) or plain text 420 (if encryption is to be performed) along with a key 422. The encryption module or decryption module is used to encrypt plain text or decrypt a cipher, accordingly, and the key expansion module is used to perform a key schedule used in encrypting or decrypting. In an embodiment, both the internal signals of the encryption/decryption module (e.g., intermediate operations in the encryption/decryption operation, system interface signals, or other operations performed by the co-processor core) and the key expansion module are fed into the checksum generation module to generate a checksum value. In an embodiment, the co-processor core further includes special function registers (SFRs) 426 accessed by the checksum generation module via an SFR interface to generate the checksum value. The checksum generation module uses the SFRs to store system states, such as intermediate results for use in subsequent calculations or operations by the co-processor core, or the current state of the checksum generation module. In an embodiment, the state of the checksum generation module depends on the previous state of the checksum generation module and signals from other functional units, such as the SFR interface. In an embodiment, the signals coming from the SFR interface depend on the software implementation, while signals from other functional units are dependent on the key and the hardware configuration. In an embodiment, the checksum generation module can compute several independent checksums instead of a single checksum in order to separate dependencies. For example, a checksum which depends only on the key, a checksum which depends only on the hardware configuration, or a checksum which depends on the software implementation and is independent from the key. In an embodiment, a software independent checksum may be transmitted from one system to another along with the key, while a checksum which is independent from the key may be hardcoded in the software. Once the checksum value is generated, the co-processor core passes the encrypted cipher or plain text 424 along with the checksum value 428 back to the main CPU for further processing FIG. 5 is a flow chart diagram of a method for performing an AES function using a co-processor core in accordance with an embodiment of the invention. At block 502, a request is sent to the co-processor core to perform an AES function. In an example, the request includes a key and a cipher or plain text sent by the main CPU core to the co-processor core. At block 504, the co-processor core sets a target address value equal to a pre-computed constant. In an embodiment, the pre-computed constant is computed by XORing an expected final checksum and an expected initial checksum, as determined by co-processor core specifications, with an address where the main CPU core should land upon completion of the AES function (e.g., a "landing pad address"). In an embodiment, the landing pad address is fixed during build time of the program for which the AES function is performed. For example, when a program is compiled, the landing pad address is fixed as the address of the instruction following the address of an AES function. At block 506, the co-processor core is initialized. In an embodiment, initializing a co-processor core involves loading values into registers in order to place the co-processor core into an initial state. The co-processor core begins performing the AES function and, at block 508, the co-processor core sets the target address equal to the XOR of the target address and a checksum value. In an embodiment, the checksum value is the expected initial checksum. Thus, the value of the target address is equal to the expected final checksum XORed with the landing pad address. At block 510, the co-processor core is configured. In an embodiment, the co-processor core is configured by setting up parameters of the co-processor core for operation (e.g., the algorithm, the key size, encryption/decryption mode, etc.). In normal operation, at block 512, a key (e.g., the key provided with the request at block 502) is loaded into one (or more) register of the co-processor core, data (e.g., the cipher or plain text provided with the request at block 502) is loaded in one (or more) register at block 514, and, at block 516, the co-processor core performs the AES function. Performing the AES function involves feeding internal signals (e.g., intermediate results of the AES function, system interface signals, or other operations performed by the co-processor core) and a key schedule to the checksum generation module to repeatedly update the checksum value until a final checksum value is generated. Thus, the final checksum value is dependent upon each update of the checksum value as the AES function and key schedule are processed and will be invalid if, for example, a fault occurs that perturbs the AES function or key schedule. In another embodiment, the final checksum value is generated, at least in part, from information about accesses of the SFRs. For example, if additional accesses of the SFRs occur (e.g., as a result of perturbation by an attacker), then the checksum value will be incorrect. At block 518, the target address is XORed with the final checksum value. If the AES function and key schedule are performed properly, the final checksum and the expected final checksum should be identical and XORing the target address with the final checksum will set the target address equal to the landing pad address, while an invalid final checksum will likely set the target address to an invalid address. As an optional measure of additional security (as indicated by the dotted lines), the target address can be compared to the expected landing address at block 520 and, if the two addresses are not identical, an error can be raised and execution of the program can be halted at block 522. After the target address has been set at block 518, the program jumps to the target address at block 524 and, at block 526, call tree integrity is confirmed. In an embodiment, call tree integrity is confirmed by another security mechanism separate from the checksum generation module or the co-processor core.

Figure 6:
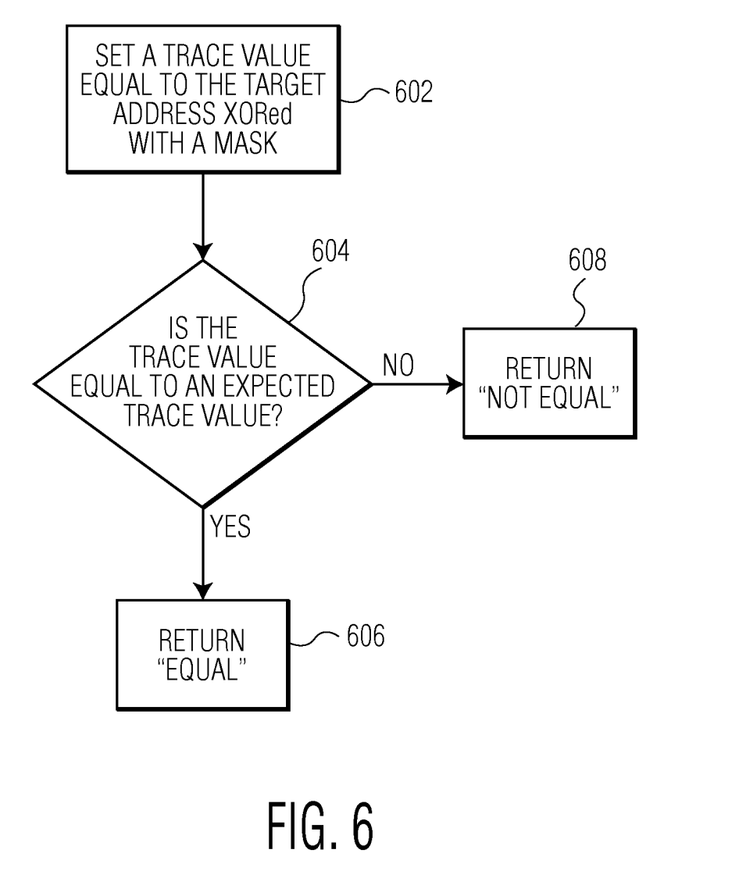
FIG. 6 is a flow chart diagram of a method for comparing a target address with a landing pad address.

As described above at block 518 of FIG. 5, an additional measure of security can be added by comparing the target address with the landing pad address before jumping to the target address. FIG. 6 is a flow chart diagram of a method for comparing the target address with the landing pad address. At block 602, a trace value is set to equal the target address XORed with a mask. In an embodiment, the mask is pre-defined when the program is compiled. At decision point 604, it is determined if the trace value is equal to an expected trace value. In an embodiment, the expected trace value is determined when the program is compiled and is equal to a pre-computed target address XORed with the mask. If the trace value is not equal to the expected trace value, then, at block 608, "not equal" is returned to the AES function. If the trace value is equal to the expected trace value, then, at block 606, "equal" is returned to the AES function. In an embodiment, if "not equal" if returned to the AES function, then the AES function will produce an error and the main CPU core will terminate the program.

Figure 7:
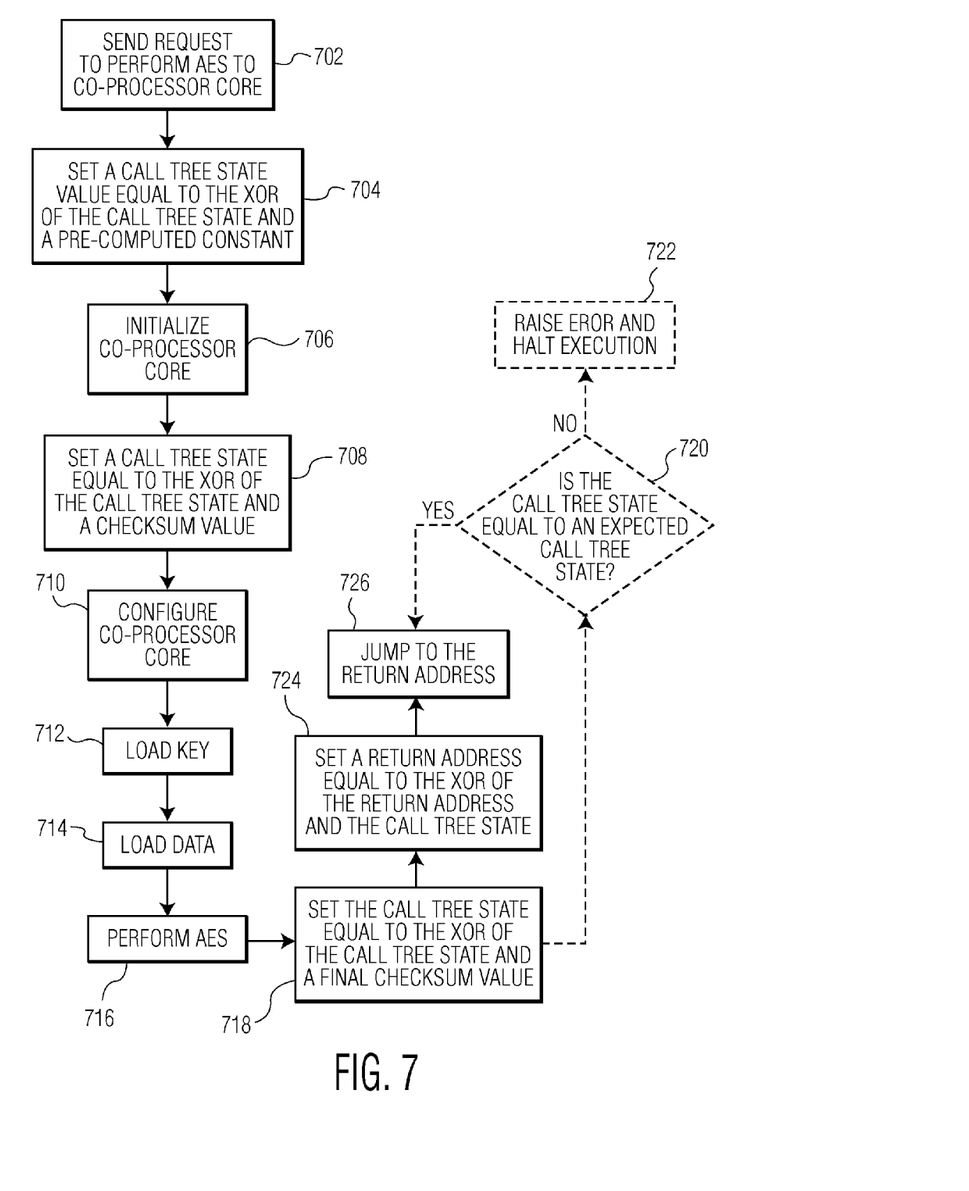
FIG. 7 is a flow chart diagram of an alternative method for performing an AES function using a co-processor core in accordance with an embodiment of the invention.

In an alternative embodiment, call tree integrity can be confirmed concurrent with performance of the AES function. Such an approach can be advantageous over the technique described with respect to FIG. 5 above at least because concurrent confirmation of call tree integrity can detect if an entire procedure is skipped (e.g., if the performance of the AES function is skipped), while the technique described with respect to FIG. 5 may not detect the skip. FIG. 7 is a flow chart diagram of an alternative method for performing an AES function using a co-processor core in accordance with an embodiment of the invention. At block 702, a request is sent to the co-processor core to perform an AES function. In an example, the request includes a key and a cipher or plain text sent by the main CPU core to the co-processor core. At block 704, the co-processor core sets a call tree state value equal to the current value of the call tree state XORed with a pre-computed constant. In an embodiment, the pre-computed constant is computed by XORing an expected final checksum, an expected initial checksum, and an expected entry call tree state value with an expected exit call tree state value. In an embodiment the expected final checksum and expected initial checksum are determined by co-processor core specifications and the expected entry call tree state value and expected exit call tree state value are pre-computed during build time of the program for which the AES function is performed using an expected return address. At block 706, the co-processor core is initialized. In an embodiment, initializing a co-processor core involves loading values into registers in order to place the co-processor core into an initial state. The co-processor core begins performing the AES function and, at block 708, the co-processor core sets the call tree state value equal to the current value of the call tree state XORed with a checksum value. In an embodiment, the checksum value is the expected initial checksum. Thus, the value of the call tree state is set to a value that is equal to the expected final checksum XORed with the expected exit call tree state value. At block 710, the co-processor core is configured. In an embodiment, the co-processor core is configured by setting up parameters of the co-processor core for operation (e.g., the algorithm, the key size, encryption/decryption mode, etc.). In normal operation, at block 712, a key (e.g., the key provided with the request at block 702) is loaded into one (or more) register of the co-processor core, at block 714, data (e.g., the cipher or plain text provided with the request at block 702) is loaded in one (or more) register, and, at block 716, the co-processor core performs the AES function. In an embodiment, performing the AES function involves feeding internal signals (e.g., intermediate results of the AES function, system interface signals, or other operations performed by the co-processor core) and key schedule to the checksum generation module to repeatedly update the checksum value until a final checksum value is generated. Thus, the final checksum value is dependent upon each update of the checksum value as the AES function and key schedule are processed and will be invalid if, for example, a fault occurs that perturbs the AES function or key schedule. In another embodiment, the final checksum value is generated, at least in part, from information about accesses of the SFRs. For example, if additional accesses of the SFRs occur (e.g., as a result of perturbation by an attacker), then the checksum value will be incorrect. At block 718, the call tree state value is XORed with the final checksum value. If the AES function and key schedule are performed properly, the final checksum and the expected final checksum should be identical and XORing the call tree state value with the final checksum will set the call tree state equal to the expected exit call tree state value, while an invalid final checksum will likely set the call tree state value to an incorrect call tree state value. As an optional measure of additional security (as indicated by the dotted lines), the call tree state value can be compared to the expected exit call tree state value at block 720 (e.g., using a technique similar to the technique of FIG. 5 described with respect to a target address) and, if the two call tree state values are not identical, an error can be raised and execution of the program can be halted at block 722. After the call tree state value has been set at block 718, the program sets a return address equal to the call tree state value XORed with the expected return address (e.g., the address used to compute the expected exit call tree state value) and, at block 726, the program jumps to the return address. Thus, call tree integrity is confirmed because if the call tree integrity is maintained, the program will jump to a valid address and if the call tree integrity is compromised, the program will jump to an invalid address.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity. Although the embodiments of the invention are described above as performing an AES function, the co-processor core can be configured to implement the above-describe techniques for other deterministic behavior such as the operations for data encryption standard (DES) or secure hash algorithm (SHA).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An integrated circuit (IC) device for detecting fault attacks, the IC device comprising:
 a main computer processing unit (CPU) core;
 memory coupled to the main CPU core;
 a co-processor core coupled to the main CPU core; and
 a checksum generation module included in the co-processor core; wherein the main CPU core is configured to execute a program, in part, by directing the co-processor core to process program data from the memory and the co-processor core is configured to process the program data, in part, by feeding internal signals to the checksum generation module; and
 wherein the co-processor core is further configured to return a checksum value generated by the checksum generation module to the main CPU core and the main CPU core is configured to terminate execution of the program if an invalid checksum value is returned;
 wherein the returned checksum value is invalid if XORing the returned checksum value with a target address yields an invalid address in the memory;
 wherein the target address is a precomputed landing pad address XORed with an expected final checksum value.

2. The IC device of claim 1, wherein the co-processor core is further configured to return a valid checksum value when the data is processed by the co-processor core.

3. The IC device of claim 1, wherein the co-processor core has special function registers (SFRs) in which system states of the checksum generation module are stored.

4. The IC device of claim 3, wherein the SFRs are configured to reset to a default value after a read operation occurs.

5. The IC device of claim 1, wherein the data is used to perform advanced encryption standard (AES) functions and the co-processor core is configured to perform the AES functions by feeding a control path and a key schedule path to the checksum generation module.

6. The IC device of claim 1, wherein additional fault detection modules are coupled to the checksum generation module and error signals from the additional fault detection modules can corrupt the checksum value generated by the checksum generation module.

7. A method for detecting fault attacks, the method comprising:
 executing a program, in part, by sending data to a co-processor core for processing, wherein processing comprises:
  feeding the data to a checksum generation module to generate a checksum value;
  storing the generated checksum value in a special function register (SFR);
  providing the checksum value stored in the SFR back to a main CPU core for further processing, wherein the checksum value includes information about accesses of the SFR; and
  resetting the SFR to a default value;
 receiving a result back from the co-processor core; and
 detecting a fault attack and terminating execution of the program if the returned checksum value is invalid;
 wherein a checksum value is invalid if XORing a target address with the checksum value produces an address that does not correspond to a valid memory location;
 wherein the target address is a precomputed landing pad address XORed with an expected final checksum value.

8. The method of claim 7, wherein the method further comprises halting execution of the program if an invalid checksum value is returned.

9. The method of claim 7, wherein a checksum value is invalid when the data is not processed by the co-processor core.

10. The method of claim 7, wherein the data sent to the co-processor core is for use in an AES function, the data including a control path and a key schedule path.

11. The method of claim 7, wherein a control path is fed to the checksum generation module separate from a key schedule path and a checksum value generated by the checksum generation module for the control path is stored in a first SFR and a checksum value generated by the checksum generation module for the key schedule path is stored in a second SFR.

* * * * *